United States Patent
Cha (10) Patent No.: US 8,914,069 B2
(45) Date of Patent: Dec. 16, 2014

(54) METHOD AND APPARATUS FOR SPEED DIALING BY MOBILE COUNTRY CODE/MOBILE NETWORK CODE IN MOBILE COMMUNICATION SYSTEM

(75) Inventor: Du-Jin Cha, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1191 days.

(21) Appl. No.: 12/265,168

(22) Filed: Nov. 5, 2008

(65) Prior Publication Data

US 2009/0124291 A1 May 14, 2009

(30) Foreign Application Priority Data

Nov. 9, 2007 (KR) ........................ 10-2007-0114561

(51) Int. Cl.
*H04B 1/38* (2006.01)
*H04M 1/2745* (2006.01)
*H04M 1/725* (2006.01)

(52) U.S. Cl.
CPC .. *H04M 1/274558* (2013.01); *H04M 1/274566* (2013.01); *H04M 1/72572* (2013.01)
USPC ........... 455/564; 455/558; 455/466; 455/445; 455/550; 455/417

(58) Field of Classification Search
CPC ..... H04M 1/271; H04M 1/725; H04M 1/604; H04M 1/40; H04B 1/38; H04B 1/48; H04B 1/50
USPC ........................ 455/564, 558, 445, 466, 565, 455/432.1–432.3
See application file for complete search history.

(56) References Cited

U.S. PATENT DOCUMENTS

| | | | |
|---|---|---|---|
| 6,185,295 B1* | 2/2001 | Frederiksen et al. | 379/355.05 |
| 6,463,300 B1* | 10/2002 | Oshima | 455/558 |
| 7,917,136 B2* | 3/2011 | Buckley et al. | 455/432.1 |
| 2004/0204117 A1* | 10/2004 | Weiner | 455/564 |
| 2005/0107112 A1 | 5/2005 | Deeds | |
| 2007/0135144 A1* | 6/2007 | Buckley et al. | 455/466 |
| 2008/0107253 A1* | 5/2008 | Gupta | 379/216.01 |
| 2008/0261603 A1* | 10/2008 | Sever et al. | 455/445 |
| 2008/0261657 A1* | 10/2008 | Amit | 455/558 |

FOREIGN PATENT DOCUMENTS

| | | |
|---|---|---|
| JP | 2000316047 A | 11/2000 |
| KR | 1019990069676 A | 9/1999 |
| KR | 1020060131120 A | 12/2006 |
| WO | 00/05858 A1 | 2/2000 |
| WO | 2007036760 A1 | 4/2007 |

* cited by examiner

*Primary Examiner* — Michael T Vu
(74) *Attorney, Agent, or Firm* — Jefferson IP Law, LLP (57) ABSTRACT

A method and apparatus for speed dialing in a mobile communication system are provided. In the method, a speed dial code is input and transmitted to a SIM card. A dialing number corresponding to the speed dial code is detected from the SIM card. The detected dialing number is transmitted to a User Equipment (UE) through a mechanism of Call Control by SIM.

25 Claims, 8 Drawing Sheets

| LEVEL 1 | LEVEL 2 | LEVEL 3 | LEVEL 4 | LEVEL 5 | LEVEL 6 |
|---|---|---|---|---|---|
| SETUP SPEED DIAL | PRIMARY SPEED DIAL | ADD TO SPEED DIAL | -> ADD NUMBER INTO SPEED DIAL ENTRIES | | |
| | | EDIT SPEED DIAL | -> EDIT SPEED DIAL ENTRY | | |
| | | DELETE FROM SPEED DIAL | -> DELETE NUMBER FROM SPEED DIAL ENTRIES | | |
| | SECONDARY SPEED DIAL | SETUP SECONDARY SD | | | |
| | | CLEAR ALL SECONDARY SD | -> DLETE ALL SECONDARY SD | | |
| | CLEAR ALL SPEED DIAL | -> DELETE ALL SD | | | |
| VIEW SPEED DIAL | PRIMARY SPEED DAIL | -> DISPLAY ALL PRIMARY SD ENTRIES | | | |
| | SECONDARY SPEED DIAL | -> DISPLAY ALL SECONDARY SD LIST | -> DISPLAY CHOSEN SD ENTRIES | | |
| STATUS | SPEED DIAL ON/OFF TOGGLE | -> THIS IS DYNAMIC MENU ASSOCIATED WITH SD STATUS | | | |
| HELP | INFORMATION ABOUT SPEED DIAL | -> DISPLAY ALL USAGE,FAQS,HELP TEXTS | | | |

METHOD AND APPARATUS FOR SPEED DIALING BY MOBILE COUNTRY CODE/MOBILE NETWORK CODE IN MOBILE COMMUNICATION SYSTEM

PRIORITY

This application claims the benefit under 35 U.S.C. §119(a) of a Korean patent application filed in the Korean Intellectual Property Office on Nov. 9, 2007 and assigned Serial No. 10-2007-0114561, the entire disclosure of which is hereby incorporated by reference.

BACKGROUND OF THE INVENTION

1. Field of the Invention

The present invention relates to a method and apparatus for speed dialing in a mobile communication system. More particularly, the present invention relates to a method and apparatus for performing a speed dial function in the event of receiving an international roaming service or changing a service network by using a speed dial applet that manages speed dialing classified by countries or networks.

2. Description of the Related Art

With development of mobile communication technologies, mobile communication terminals have become greatly popular and are an important if not essential accessory to most people. One convenient feature of a mobile communication terminal is its ability to store information, especially telephone numbers of friends, acquaintances, frequented restaurants and the like. That is, a user is able to store telephone numbers in a memory of a mobile communication terminal in order to more conveniently use the mobile communication terminal by not having to remember so many important numbers. Furthermore, the mobile communication terminal may be provided with a speed dial function. With the speed dial function, the user maps a telephone number, used frequently among the stored telephone numbers, to a speed dial number or code. By having the frequently called telephone number mapped to a speed dial number, the user is able to merely input the speed dial number to place a phone call to the telephone number mapped to the speed dial number. Thus, the user can save time by not having to remember and dial the desired telephone number.

A Subscriber Identity Module (SIM) card is detachably installed in a mobile communication terminal that is based on the Global System for Mobile communications (GSM). Certain information about the user is stored in the SIM card. Therefore, if the SIM card is installed in another mobile communication terminal, for example a mobile terminal that is not owned by the user, the user can still be provided a communication service through the other mobile communication terminal by means of his own telephone number.

A SIM Application Toolkit (SAT) is used to provide an interface between the mobile communication terminal and the SIM card. More specifically, an SAT provides a mechanism for admission of applications and supports a standard SIM toolkit mechanism necessary by the application to enable an interaction with the mobile communication terminal.

Figure 1:
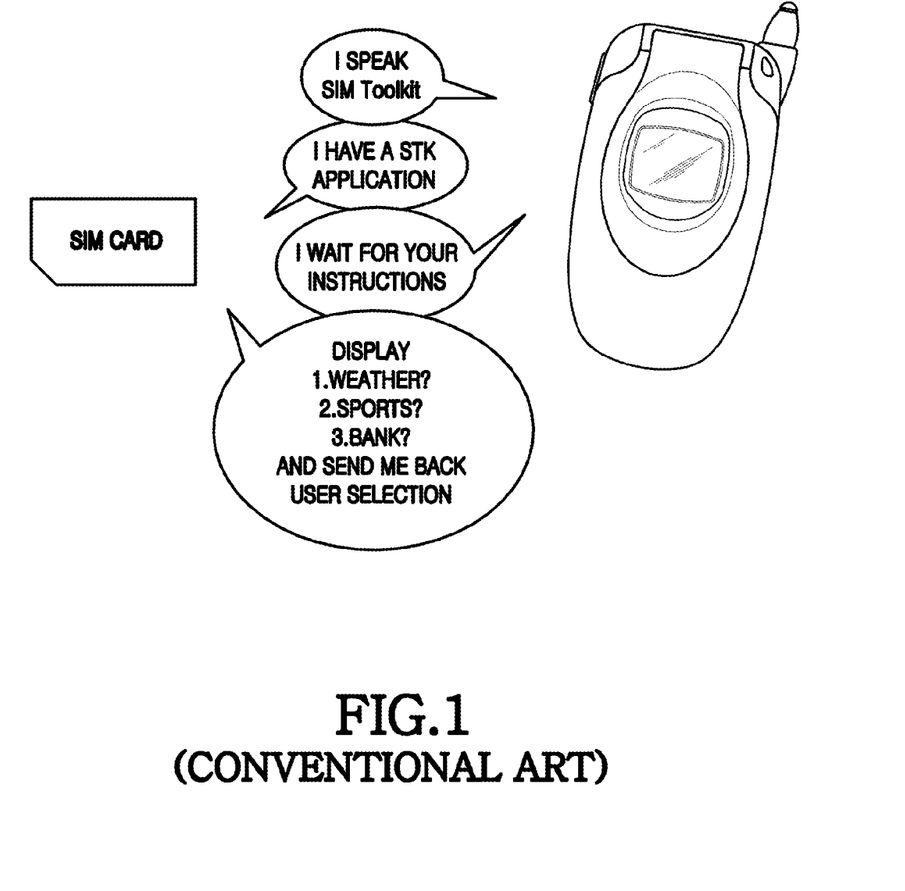
FIG. 1 is a diagram illustrating an example of a conventional SIM toolkit mechanism.

FIG. 1 is a diagram illustrating an example of a conventional SIM toolkit mechanism.

Referring to FIG. 1, an SAT is used to allow a SIM card to send commands to the terminal. Through these commands, a user may provide an input and obtain a menu display or an SMS message transmission function. In actuality, a mobile communication terminal operates as a master and a SIM card operates as a slave that receives function requests from the terminal. A corresponding application is stored in the SIM card.

For example, it is assumed that a terminal can connect to a SIM card by a SIM toolkit and the SIM card has a SIM toolkit application installed.

The terminal waits for a command from the SIM card. The SIM card displays a corresponding application list to be selected by a user of the terminal. For example, the SIM card may display information about the weather, information about sports, information about bank businesses, etc. and the terminal's user selects a corresponding application.

Herein, commands operating an SAT are based on the contents specified in the 3GPP TS 11.14 standard which is the specification of the SIM Application Toolkit for the Subscriber Identity Module-Mobile Equipment (SIM-ME) interface. Commands transmitted from the SIM card to the terminal are called proactive commands and commands transmitted from the terminal to the SIM card are called envelope commands. By a combination of such commands, service providers develop their unique services, such as transmission/reception of SMS messages providing specific services and connection of calls by specific service numbers, to provide SIM applications.

As described above, in the case of a conventional SAT function, a service provider implements the SAT function for a specific service in a SIM (i.e., a built-in SAT service), and a user selects an SAT menu to receive a specific service, for example a request for weather information, traffic information and the like, by dialing or by transmitting a text message.

In the case of a conventional speed dial function set in a terminal, a speed dial must be reset in the event of a change to another terminal and only one dialing number (or application) can be registered in one speed dial number.

Also, in the event of an international roaming mode, a speed dial used in a home network cannot be used in a foreign network and must be registered again.

Also, when Global System for Mobile communications (GSM)/Universal Mobile Telecommunications System (UMTS)/Wideband Code Division Multiple Access (WCDMA) schemes are used by multi-mode terminals and various network SIM cards, if a Service Dial Number (SDN) of a specific service network is registered in a speed dial, a corresponding speed dial does not operate in the event of a change to another network.

SUMMARY OF THE INVENTION

An aspect of the present invention is to address at least the above-mentioned problems and/or disadvantages and to provide at least the advantages described below. Accordingly, an aspect of the present invention is to provide a method and apparatus for performing a speed dial function without a change thereof even in the event of a terminal change, an international roaming service, or a service network change by storing/managing speed dial data in a Universal IC Card (UICC) installed in a mobile communication terminal.

According to an aspect of the present invention, a method for speed dialing in a mobile communication system is provided. The method includes inputting a speed dial code, transmitting the speed dial code to a SIM card, detecting a dialing number corresponding to the speed dial code from the SIM card and transmitting the detected dialing number to a User Equipment (UE) through a mechanism of Call Control by SIM.

According to another aspect of the present invention, an apparatus for speed dialing in a mobile communication system is provided. The apparatus includes a keypad for inputting a speed dial code, an application toolkit for transmitting the speed dial code to a SIM card, a speed dial applet for detecting a dialing number corresponding to the speed dial code from the SIM card and a speed dial provider for transmitting the detected dialing number to a UE through a mechanism of Call Control by SIM.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, it should be noted that like reference numbers are used to depict the same or similar elements, features and structures

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Also, the terms used herein are defined according to the functions of the present invention. Thus, the terms may vary depending on a user's or operator's intentions or practices. Therefore, the terms used herein must be understood based on the descriptions made herein.

Exemplary embodiments of the present invention provide a method and apparatus for speed dialing in a mobile communication system.

Figure 2:
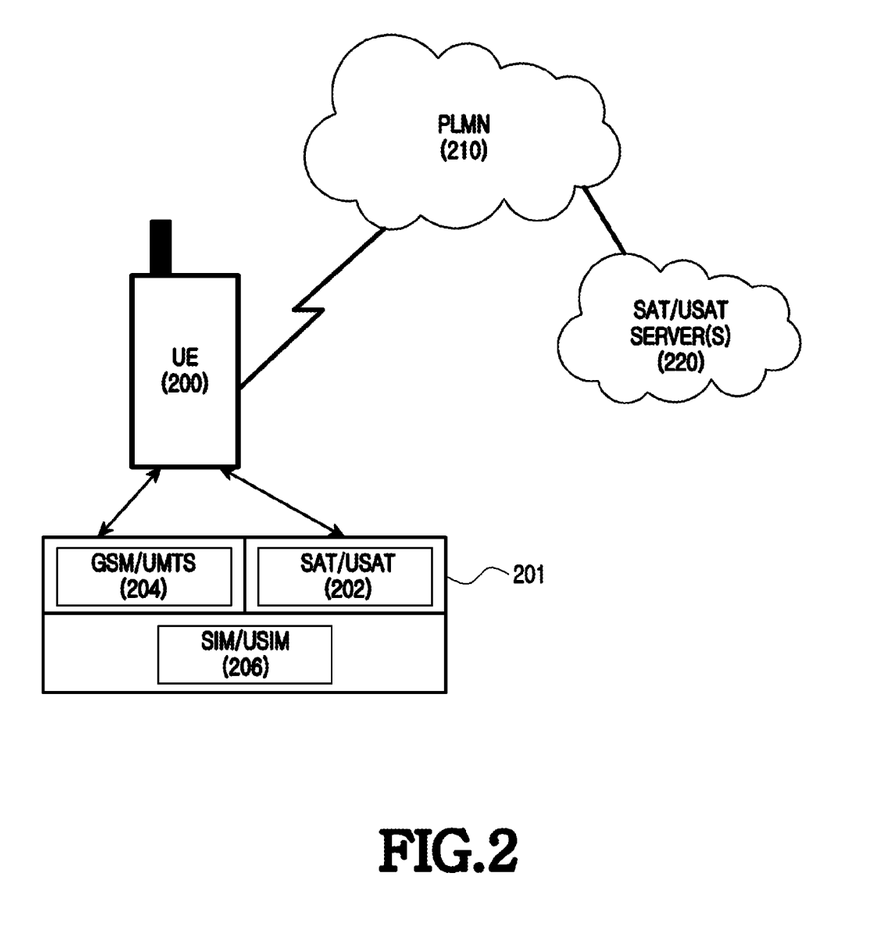
FIG. 2 is a diagram illustrating a configuration of a mobile communication system according to an exemplary embodiment of the present invention.

FIG. 2 is a diagram illustrating a configuration of a mobile communication system according to an exemplary embodiment of the present invention.

Referring to FIG. 2, a User Equipment (UE) 200 receives a communication service through a Public Land Mobile Network (PLMN) 210, and receives various supplementary services (e.g., personal information management, certified authentication, financial management, security management, information distribution, etc.) through a detachable Universal IC Card (UICC) 201.

The UICC 201 is a multifunctional smart card that provides various supplementary services, such as communication and financial services, as well as subscriber authentication for a stable network connection to a portable Internet.

Herein, a GSM/UMTS 204 and an SAT/USAT 202 provide an interface between the UE 200 and an application installed in a SIM/USIM 206. Furthermore, the GSM/UMTS 204 provides an interface between the UE 200 and the SIM/USIM 206 for a GSM/UMTS service.

An SAT/USAT server 220 provides a supplementary service in cooperation with an application installed in the UICC 201. According to an exemplary embodiment, the SAT/USAT server 220 may be included in the PLMN 210.

Figure 3:
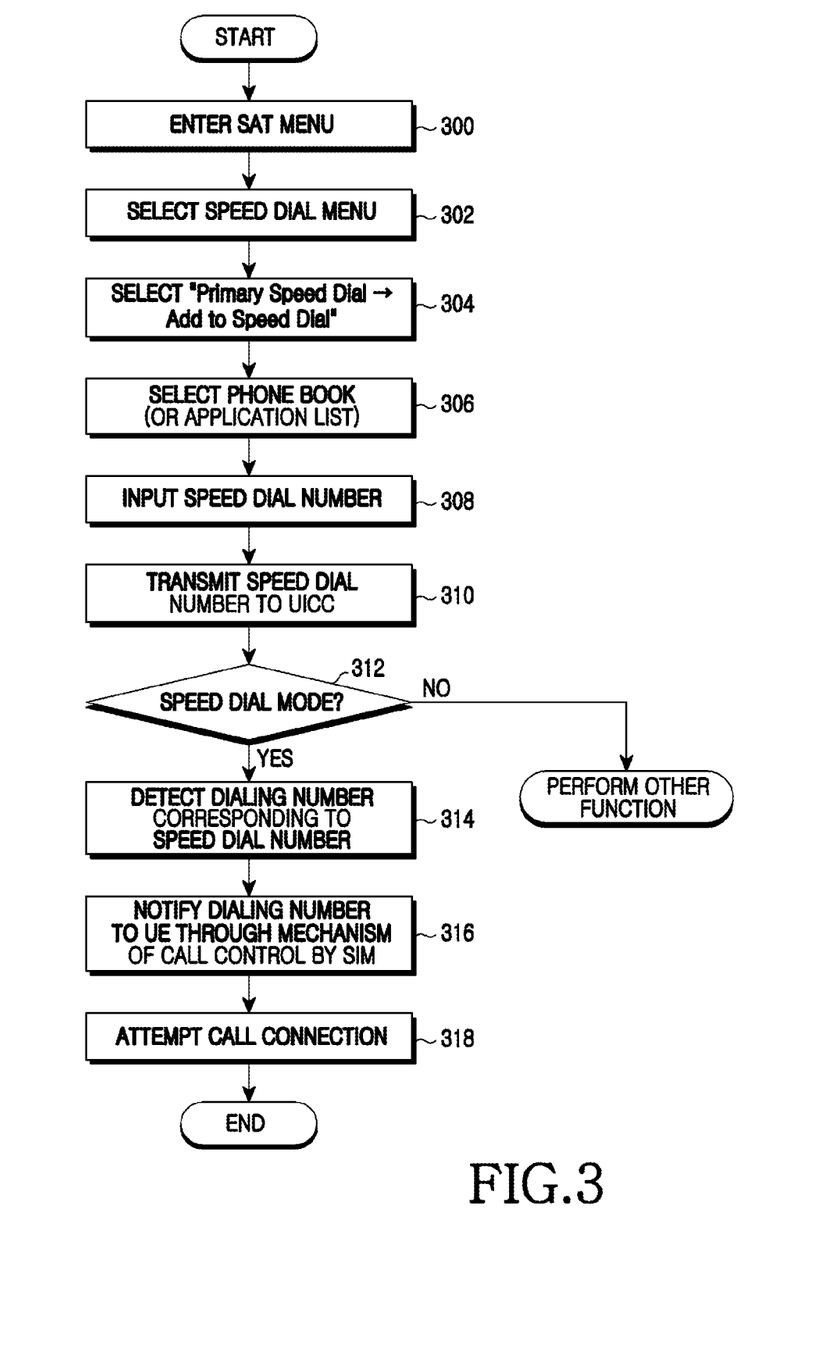
FIG. 3 is a flowchart illustrating a process for performing a speed dial function in a mobile communication system according to an exemplary embodiment of the present invention.

FIG. 3 is a flowchart illustrating a process for performing a speed dial function in a mobile communication system according to an exemplary embodiment of the present invention. In the explanation of FIG. 3, reference is made to menu selections which will be further explained with reference to FIG. 6.

Referring to FIG. 3, in step 300, a UE enters an SAT menu in order to set and use a speed dial function. A specific service in a SIM card can be received through the SAT.

In step 302, the UE selects a "Setup Speed Dial" submenu for speed dial setup.

In step 304, the UE selects "Primary Speed Dial→Add to Speed Dial" of the "Setup Speed Dial" submenu.

In step 306, the UE selects a telephone number from a phonebook, an application list or receives a phone number as input from a user and stores the telephone number with an associated speed dial code. According to an exemplary embodiment, a user may use a keypad to input/store a telephone number in a speed dial. In this example, it is assumed that a telephone number "010-9530-8216" is selected from a phonebook or an application list and is stored in a UICC with an associated speed dial code of "3" to add a speed dial function. It is to be understood that the speed dial code may comprise any number of numeric digits or other symbols.

In step 308, a corresponding speed dial code on an idle screen of the UE is pressed and held for a long duration. In this example, it is assumed that a speed dial code of "3" on an idle screen is pressed and held for a long duration by the user. Herein, the term "long duration" refers to a duration that is sufficient to activate the speed dial function while avoiding spurious activation by casual contact or activation during routine dialing or other keypad use. The sufficient duration may be set by the manufacturer at, for example, 3 seconds and may be altered by the user.

In step 310, the UE transmits the speed dial code to the UICC (e.g., an SIM/USIM). The UICC can be attached/detached to/from the inside of the UE, examples of which include a Subscriber Identity Module (SIM) card and a Universal Subscriber Identity Module (USIM) card.

In step 312, the UICC detects a speed dial mode. Herein, the speed dial mode indicates from which network and/or in which country the UE is receiving a communication service. That is, it is detected to which Mobile Country Code (MCC) and/or to which Mobile Network Code (MNC) the UE is set. Then, in step 314, in consideration of the MCC value and the MNC value, a speed dial code is detected and the UICC searches for a corresponding dialing number. The reason for this is that, as will be explained in more detail with reference to FIG. 7 below, various dialing numbers can be registered and associated with one speed dial code according to the MCC and the MNC. In the alternative, if a speed dial mode is not detected in step 312, the UE performs another function.

In step 316, the UICC detects a dialing number corresponding to the speed dial code (e.g., a dialing number "010-9530-8216" corresponding to a speed dial code of "3") and notifies the UE of the detected dialing number through a mechanism of Call Control by SIM.

The mechanism of Call Control by SIM is a function defined in the 3GPP TS 11.14 standard. When the corresponding function is activated in the UICC, dialed strings, supplementary service control strings, and Unstructured Supplementary Service Data (USSD) strings are input into the UE and are controlled by the UICC prior to a call setup/service operation. The UICC may provide a function such as reattempt after admitting/denying/changing of an input call, a Supplementary Service (SS) operation, and a USSD operation. The UICC may change a call/SS operation/USSD operation request into another call/SS operation/USSD operation request, and may request the same to the network.

In step 318, the UE receives a dialing number (e.g., 010-9530-8216) corresponding to the speed dial code from the UICC to attempt a call connection. In this case, the user can detect the dialing number "010-9530-8216" through a User Interface (UI).

Thereafter, the exemplary process for the speed dial function of FIG. 3 is ended. It is to be understood that after step 306 has been completed, because a telephone number has been selected and stored with an associated speed dial code, the process of FIG. 3 may be ended after that step. Furthermore, it should be understood that, if step 306 has been completed, the process may begin at step 308 at anytime thereafter. That is, step 308 does not need to follow step 306 in an immediate fashion.

FIG. 3 has illustrated an exemplary process for performing a speed dial function by adding a speed dial code. Although not illustrated in FIG. 3, a speed dial editing/deleting function and a speed dial displaying function may be further provided in addition to the speed dial adding function. A SIM applet menu for speed dialing will be illustrated and explained in more detail below with reference to FIG. 6.

Figure 4:
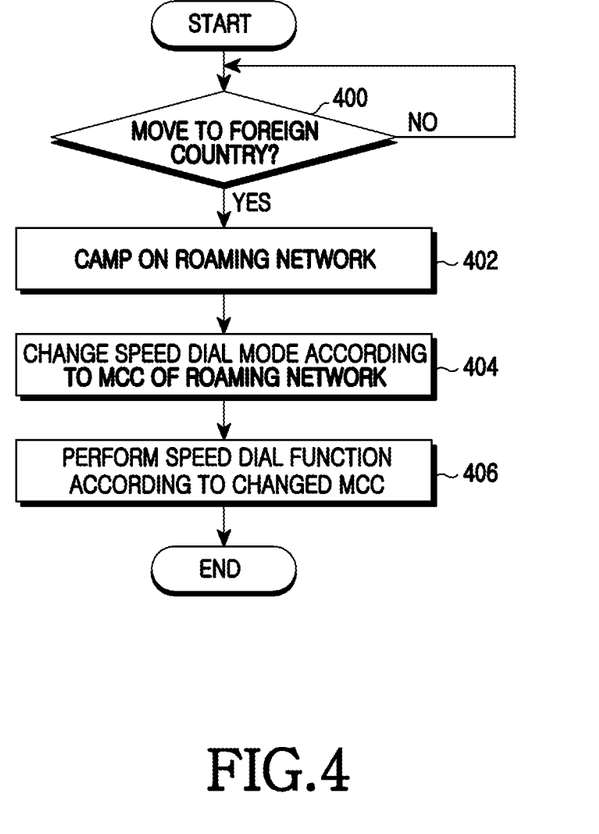
FIG. 4 is a flowchart illustrating a process for performing a speed dial function in the event of movement to a foreign country according to an exemplary embodiment of the present invention.

FIG. 4 is a flowchart illustrating a process for performing a speed dial function in the event of movement to a foreign country according to an exemplary embodiment of the present invention.

Referring to FIG. 4, in step 400, a UE determines if there is movement (e.g., personal travel or a business trip) to a country which provides a roaming network. If so, the process proceeds to step 402. In step 402, the UE camps on the roaming network.

Is step 404, the UE automatically changes a speed dial mode according to an MCC value of the corresponding network.

In step 406, the UE performs a speed dial function according to the changed MCC. For example, although a speed dial code "3" was set to "010-9530-8216" in the home network, if the speed dial code "3" is pressed and held for a long duration after the camping on the roaming network, a call is connected to a different dialing number (e.g. "216-223-6875") in the roaming network according to the changed MCC.

Thereafter, the exemplary process of FIG. 4 is ended.

Figure 5:
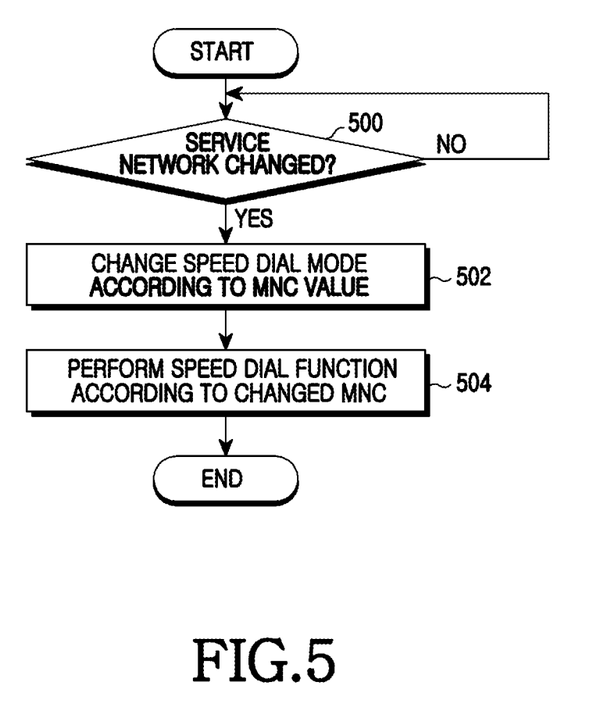
FIG. 5 is a flowchart illustrating a process for performing a speed dial function in the event of a service network change according to an exemplary embodiment of the present invention.

FIG. 5 is a flowchart illustrating a process for performing a speed dial function in the event of a service network change according to an exemplary embodiment of the present invention.

Referring to FIG. 5, in step 500, a UE determines if there is a service network change. If so, the process proceeds to step 502. In step 502, the UE changes a speed dial mode according to a service network MNC value.

In step 504, the UE performs a speed dial function according to the changed MNC. Thereafter, the exemplary process of FIG. 5 is ended.

As described above, in the event of a service network change (e.g. in the case of using various service networks by one GSM/UMTS/WCDMA terminal), a Service Dialing Number (SDN) of a specific service network may be registered/used as a speed dial. For example, a speed dial code "1" may be set to an SS string corresponding to checking a Balance charge in an American AT&T SIM (e.g., a speed dial code "1" is registered/used as an SS string of *111#), and the speed dial code "1" may also be set to check a T-mobile balance charge in a T-Mobile SIM of another service network (e.g., a speed dial code "1" is used as a speed dial registered as an SS string of *678# of a T-mobile service network). That is, although the speed dial code "1" can be used for checking a balance in each network, the speed dial code is associated with different dialing numbers (i.e. *111# for AT&T and *678# for T-mobile) depending on the network. Thus, multiple dialing numbers or SS strings may be registered/used for one speed dial code according to each service network.

Figure 6:
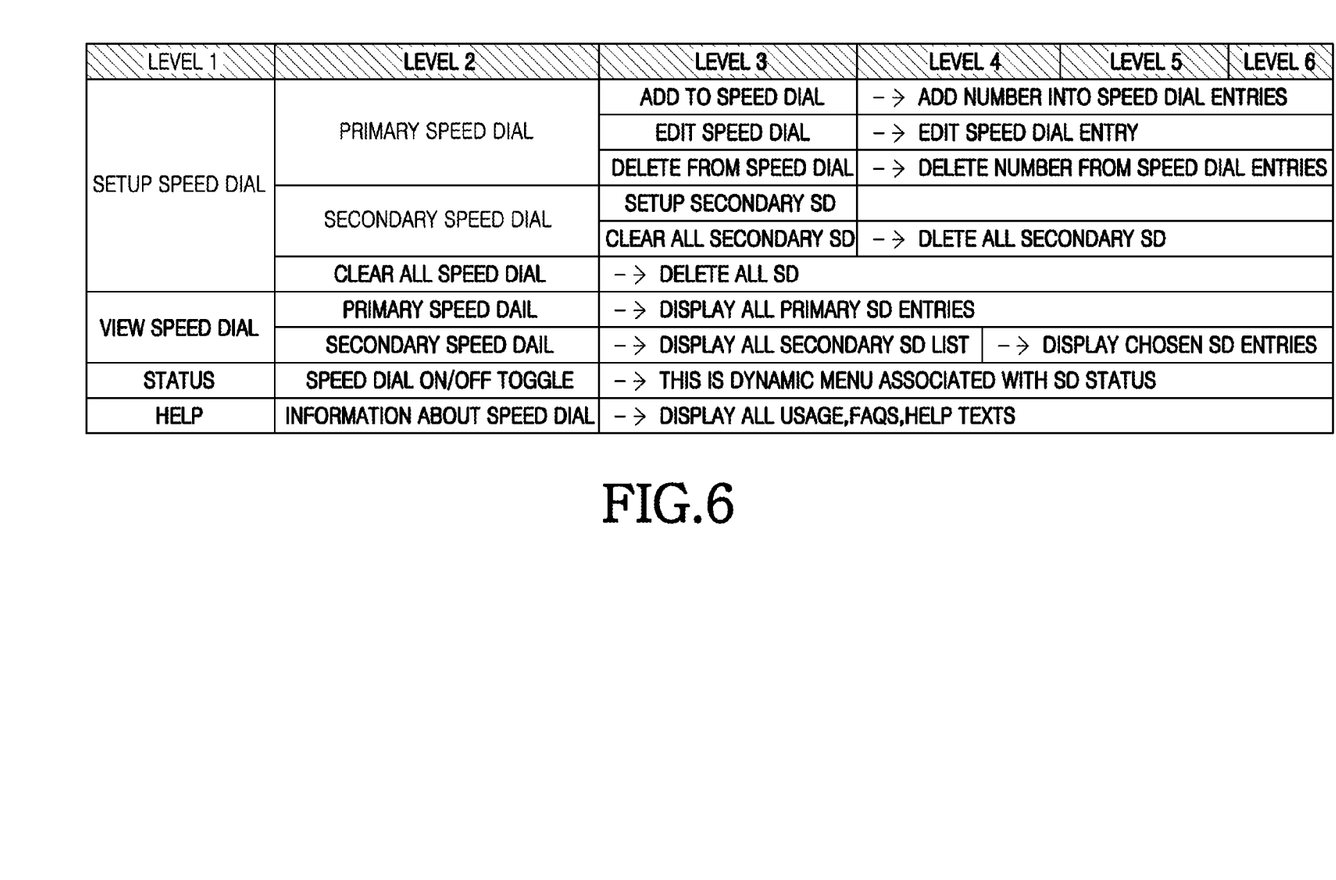
FIG. 6 is a table illustrating a format of a SIM applet menu according to an exemplary embodiment of the present invention.

FIG. 6 is a table illustrating a format of a SIM applet menu according to an exemplary embodiment of the present invention.

Referring to FIG. 6, if a UE enters an SAT menu for management of a speed dial function, "Setup Speed Dial", "View Speed Dial", "Status", "Help" submenus of level 1 are displayed.

If a "Setup Speed Dial" menu for setting a speed dial is selected, "Primary Speed Dial", "Secondary Speed Dial" and "Clear All Speed Dial" submenus of level 2 are displayed.

If a "Primary Speed Dial" submenu is selected, "Add to Speed Dial", "Edit Speed Dial", and "Delete from Speed Dial" submenus of level 3 are displayed. Herein, if "Add to Speed Dial" is selected, a user can add numbers to first speed dial entries. If "Edit Speed Dial" is selected, the user can edit the registered first speed dial entry. If "Delete from Speed Dial" is selected, the user can delete numbers from the first speed dial entries. If a "Secondary Speed Dial" submenu is selected, "Setup Secondary SD" and "Clear All Secondary SD" submenus of level 3 are displayed. Herein, if "Setup Secondary SD" is selected, the user can add/edit/delete second speed dial entries. If a "Clear All Secondary SD" submenu is selected, the user can delete all of the second speed dial entries. If "Clear All Speed Dial" is selected, the user can delete all of the speed dial entries.

If a "View Speed Dial" menu is selected, "Primary Speed Dial", and "Secondary Speed Dial" submenus of level 2 are displayed. Herein, if "Primary Speed Dial" is selected, all of the first speed dial entries are displayed. Similarly, if "Secondary Speed Dial" is selected, all of the second speed dial lists of level 3 are displayed and the second speed dial entries selected from level 4 are displayed.

If a "Status" menu is selected, a speed dial function can be turned on or off from Speed Dial on/off toggle of level 2.

If a "Help" menu is selected, information about speed dials of level 2 is displayed. For example, Usage, FAQs, and Help texts are displayed.

Figure 7:
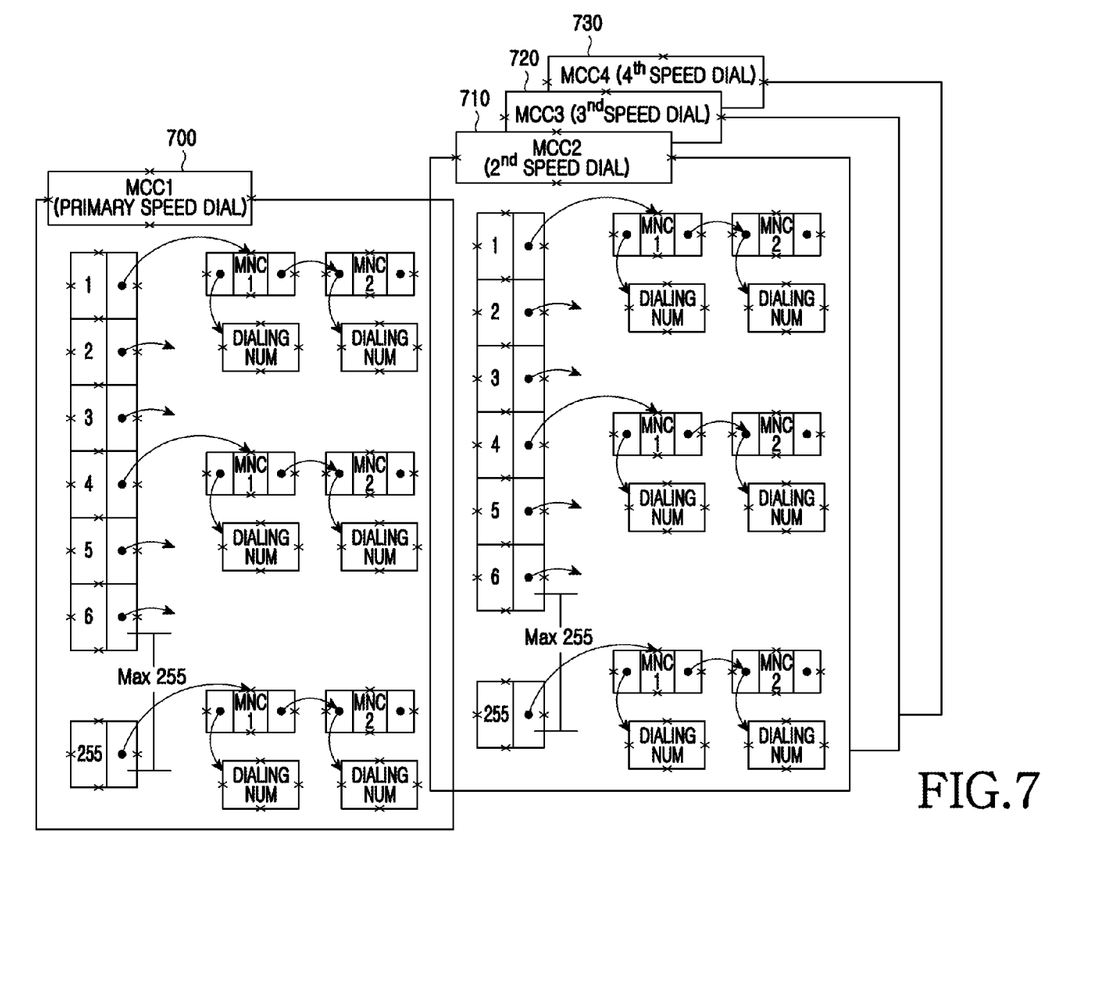
FIG. 7 is a diagram illustrating a structure of a speed dial applet according to an exemplary embodiment of the present invention.

FIG. 7 is a diagram illustrating a structure of a speed dial applet according to an exemplary embodiment of the present invention.

Referring to FIG. 7, an example of a speed dial applet structure for performing a speed dial function for each country code or network code is illustrated. For example, when a service is provided from a Korean first service network, a speed dial code "1" is set to a first number (e.g. "02-723-3123"). When a service is provided from a Korean second service network, the speed dial code "1" is set to a second number (e.g. "010-3773-3342"). Likewise, when a service is provided from an American first service network, the speed dial code "1" is set to third number (e.g. "213-123-4567"). When a service is provided from an American second service network, the speed dial code "1" is set to a fourth number (e.g. "070-123-4567"). Herein, the countries are classified by Mobile Country Codes (MCCs) and the service networks are classified by Mobile Network Codes (MNCs).

If there are four countries and two service networks for each country, the user may set speed dials to an MCC1 700, an MCC2 710, an MCC3 720, and an MCC4 730 for the respective countries. Also, the user may set speed dials to the MCC1 700, the MCC2 710, the MCC3 720, and the MCC4 730 for the respective service networks. Numbers 1 to 255 are speed dial numbers, and the number of the speed dial numbers may increase to N according to exemplary embodiments.

Figure 8:
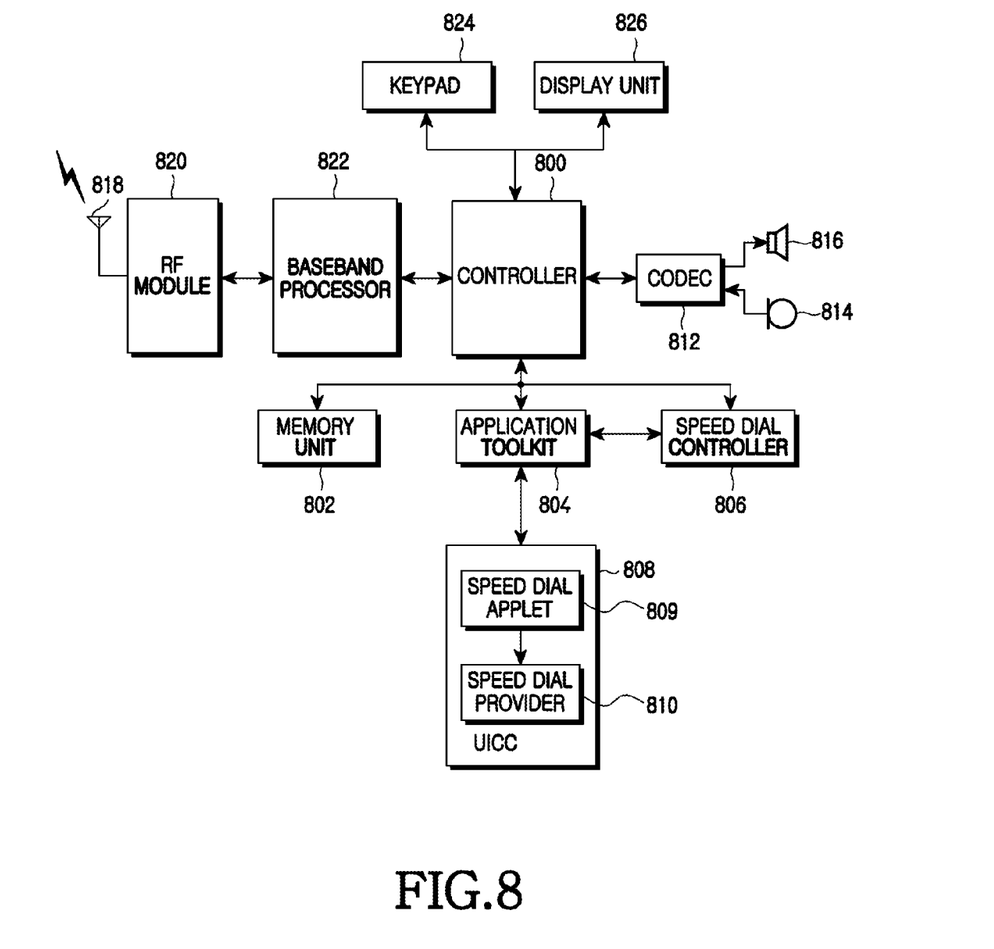
FIG. 8 is a block diagram of a user equipment for performing a speed dial function according to an exemplary embodiment of the present invention.

FIG. 8 is a block diagram of a User Equipment (UE) for performing a speed dial function according to an exemplary embodiment of the present invention. Examples of the UE include a cellular phone, a Personal Communication System (PCS) terminal, a Personal Data Assistant (PDA), and an International Mobile Telecommunications-2000 (IMT-2000) terminal. The following description is made in terms of a general structure of the above terminals.

Referring to FIG. 8, the UE includes a controller (e.g., a microprocessor unit (MPU)) 800, a memory unit 802, an application toolkit 804, a speed dial controller 806, a Universal IC Card (UICC) 808, a coder-decoder (Codec) 812, a microphone 814, a speaker 816, an antenna 818, a Radio-Frequency (RF) module 820, a baseband processor 822, a keypad 824, and a display unit 826.

The controller 800 controls an overall operation of the UE. For example, the controller 800 processes and controls voice communication and data communication. In addition to the general functions, the controller 800 performs a call connection using a dialing number received from the UICC 808.

The memory unit 802 stores a variety of reference data and microcodes of a program for the process and control operations of the controller 800. Also, the memory unit 802 serves as a working memory of the controller 800, which stores temporary data that are generated during the execution of various programs.

The keypad 824 includes numeric keys of digits 0-9 and a plurality of function keys, such as a Menu key, a Cancel (Delete) key, a Confirmation key, a Talk key, an End key, an Internet connection key, Navigation keys (▲/▼/◄/►) and the like. The keypad 824 provides the controller 800 with key input data that corresponds to a key pressed by a user. The display unit 826 displays a number of characters, moving pictures, still pictures, and status information generated during the operation of the UE. The display unit 826 may be a color Liquid Crystal Display (LCD), and displays a stored message. The display unit 826 may include a controller for controlling the LCD and a video memory in which image data is stored. If the LCD is provided as a touch screen, the display unit 826 may perform a part or all of the functions of the keypad 824.

The Codec 812 connected to the controller 800, and the speaker 816 and the microphone 814 connected to the Codec 812 constitute an audio input/output block that is used for telephone communication and voice recording. The Codec 812 converts Pulse Code Modulation (PCM) data received from the controller 800 into analog audio signals and outputs the analog audio signals through the speaker 816. Also, the Codec 812 converts audio signals received through the microphone 814 into PCM data and provides the PCM data to the controller 800.

The RF module 820 down-converts an RF signal received through the antenna 818 and provides the resulting baseband signal to the baseband processor 822. Also, the RF module 820 up-converts a baseband signal provided from the baseband processor 822 and transmits the resulting RF signal through the antenna 818. The baseband processor 822 processes the baseband signals that are exchanged between the RF module 820 and the controller 800. For example, the baseband processor 822 performs channel coding and spreading on data to be transmitted, and performs despreading and channel decoding on received data.

The application toolkit 804 transfers control signals or data from the controller 800 to the UICC 808, and transfers control signals or data from the UICC 808 to the controller 800.

When a speed dial code is input from the keypad 824, the speed dial controller 806 receives necessary information from the UICC 808 to control a speed dial function.

The UICC 808 includes a speed dial applet 809 and a speed dial provider 810. When a speed dial code is input, the speed dial applet 809 detects a speed dial mode, detects a dialing number corresponding to the speed dial code, and outputs the detected dialing number to the speed dial provider 810. The speed dial provider 810 transmits the detected dialing number to the controller 800 through a mechanism of Call Control by SIM. Herein, the speed dial mode is determined by a Mobile Country Code (MCC) or a Mobile Network Code (MNC) (see again FIG. 7).

The speed dial applet 809 automatically changes the speed dial mode in the event of an international roaming service, and also changes the speed dial mode in the event of a service network change. Also, the speed dial applet 809 adds/deletes/edits the speed dial code.

As described above, according to exemplary embodiments of the present invention, one speed dial code has a plurality of dialing numbers associated therewith, for example a plurality of dialing numbers according to an MCC and an MNC.

As also described above, exemplary embodiments of the present invention store/manage speed dial data in a UICC installed in a mobile communication terminal, thereby making it possible to use the preset speed dial code without a change thereof in the event of a terminal change. Also, it is unnecessary to register a speed dial code in a roaming country even in the event of an international roaming service, because of an automatic conversion to a speed dial code to be used in the roaming country. Also, even when one mobile communication terminal uses UICCs of two networks, an SDN of the specific network can be registered/used as a speed dial.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims, and all differences within the scope will be construed as being included in the present invention.

What is claimed is:

1. A method for speed dialing in a mobile communication system, the method comprising:
    inputting a speed dial code comprising a user-selected input for designating a call destination, wherein the speed dial code is shorter than a corresponding dialing number associated with the call destination;
    transmitting the speed dial code to a Subscriber Identity Module (SIM) card;
    determining the dialing number corresponding to the speed dial code from the SIM card according to a speed dial mode of a plurality of speed dial modes; and
    transmitting the detected dialing number to a User Equipment (UE) through a mechanism of Call Control by SIM,
    wherein the plurality of speed dial modes comprise a Mobile Country Code (MCC) and a Mobile Network Code (MNC), and
    wherein the call destination corresponding to the user-selected speed dial code according to each speed dial mode of the plurality of speed dial modes is determined without regard for a call destination corresponding to the speed dial code according to another speed dial mode.

2. The method of claim 1, further comprising connecting a call in the UE by using the detected dialing number.

3. The method of claim 1, further comprising detecting the speed dial mode.

4. The method of claim 3, wherein the detecting of the speed dial mode comprises automatically changing the speed dial mode in the event of receiving an international roaming service.

5. The method of claim 3, wherein the detecting of the speed dial mode comprises automatically changing the speed dial mode in the event of changing a service network.

6. The method of claim 1, wherein the speed dial code is set to a Supplementary Service (SS) string.

7. The method of claim 1, further comprising at least one of adding, deleting and editing the speed dial code.

8. The method of claim 7, wherein the at least one of adding, deleting and editing of the speed dial code is performed by a speed dial applet operating in the SIM card.

9. The method of claim 1, wherein an interface between the SIM card and the UE is provided by a SIM Application Toolkit (SAT).

10. The method of claim 1, wherein the SIM card comprises a Universal Subscriber Identity Module (USIM).

11. The method of claim 1, wherein the speed dial code is associated with a plurality of dialing numbers according to at least one of a Mobile Country Code (MCC) and a Mobile Network Code (MNC).

12. The method of claim 1, further comprising at least one of adding, deleting and editing the dialing number and call destination corresponding to the speed dial code according to the speed dial mode.

13. The method of claim 1, further comprising displaying a call destination corresponding to a speed dial code according to a current speed dial mode.

14. An apparatus for speed dialing in a mobile communication system, the apparatus comprising:
    a keypad for inputting a speed dial code comprising a user-selected input for designating a call destination, wherein the speed dial code is shorter than a corresponding dialing number associated with the call destination;
    an application toolkit for transmitting the speed dial code to a Subscriber Identity Module (SIM) card;
    a speed dial applet for determining the dialing number corresponding to the speed dial code from the SIM card according to a speed dial mode of a plurality of speed dial modes; and
    a speed dial provider for transmitting the detected dialing number to a User Equipment (UE) through a mechanism of Call Control by SIM,
    wherein the plurality of speed dial modes comprise a Mobile Country Code (MCC) and a Mobile Network Code (MNC), and
    wherein the call destination corresponding to the user-selected speed dial code according to each speed dial mode of the plurality of speed dial modes is determined without regard for a call destination corresponding to the speed dial code according to another speed dial mode.

15. The apparatus of claim 14, further comprising a controller for connecting a call by using a dialing number received from the SIM card.

16. The apparatus of claim 14, wherein the speed dial applet detects the speed dial mode.

17. The apparatus of claim 16, wherein the speed dial mode is automatically changed in the event of receiving an international roaming service.

18. The apparatus of claim 16, wherein the speed dial mode is automatically changed in the event of changing a service network.

19. The apparatus of claim 14, wherein the speed dial code is set to a Supplementary Service (SS) string.

20. The apparatus of claim 14, wherein the apparatus at least one of adds, deletes and edits the speed dial code.

21. The apparatus of claim 20, wherein the at least one of adding, deleting and editing of the speed dial code is performed by a speed dial applet operating in the SIM card.

22. The apparatus of claim 14, wherein an interface between the SIM card and the UE comprises a SIM Application toolkit (SAT).

23. The apparatus of claim 14, wherein the SIM card comprises a Universal Subscriber Identity Module (USIM).

24. The apparatus of claim 14, wherein the speed dial code is associated with a plurality of dialing numbers according to at least one of a Mobile Country Code (MCC) and a Mobile Network Code (MNC).

25. The apparatus of claim 14, further comprising a display displaying a call destination corresponding to the speed dial code according to a current speed dial mode.

* * * * *